US006553387B1

(12) United States Patent
Cabrera et al.

(10) Patent No.: US 6,553,387 B1
(45) Date of Patent: Apr. 22, 2003

(54) LOGICAL VOLUME CONFIGURATION DATA MANAGEMENT DETERMINES WHETHER TO EXPOSE THE LOGICAL VOLUME ON-LINE, OFF-LINE REQUEST BASED ON COMPARISON OF VOLUME EPOCH NUMBERS ON EACH EXTENTS OF THE VOLUME IDENTIFIERS

(75) Inventors: Luis Felipe Cabrera, Bellevue, WA (US); Catharine van Ingen, Berkeley, CA (US); Norbert P. Kusters, Woodinville, WA (US); Rod N. Gamache, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/450,300

(22) Filed: Nov. 29, 1999

(51) Int. Cl.⁷ .......................... G06F 12/00; G06F 17/30
(52) U.S. Cl. .......................... 707/200; 707/1; 707/204; 707/100; 707/103; 711/114; 711/167; 711/170
(58) Field of Search ................... 707/200–205, 707/1–2, 100–104.1; 709/100, 105, 200–205, 223, 224, 235; 714/5, 15–16, 19–20, 2, 6; 710/31, 74, 17–22; 711/162, 167, 170, 110–118, 150–156

(56) References Cited

U.S. PATENT DOCUMENTS

| 5,276,867 A | * | 1/1994 | Kenley et al. | 707/204 |
| 5,435,004 A | * | 7/1995 | Cox et al. | 707/205 |
| 5,897,661 A | * | 4/1999 | Baranovsky et al. | 707/205 |
| 5,974,515 A | * | 10/1999 | Bachmat et al. | 710/8 |
| 5,996,075 A | * | 11/1999 | Matena | 713/200 |
| 6,076,143 A | * | 6/2000 | Blumenau | 711/114 |
| 6,151,688 A | * | 11/2000 | Wipfel et al. | 709/224 |
| 6,185,661 B1 | * | 2/2001 | Ofek et al. | 711/145 |
| 6,216,211 B1 | * | 4/2001 | McBreaty et al. | 711/162 |
| 6,266,740 B1 | * | 7/2001 | Don et al. | 711/114 |
| 6,272,571 B1 | * | 8/2001 | Bachmat | 710/74 |

FOREIGN PATENT DOCUMENTS

| EP | 0762267 A2 | * | 3/1997 |
| EP | 0767431 | * | 4/1997 |
| EP | 0853281 | * | 7/1998 |
| EP | 1137004 A2 | * | 9/2001 |
| GB | 2297636 A | * | 8/1996 |

OTHER PUBLICATIONS

"XFS: A Next Generation Journalled 64–Bit Filesystem with Guaranteed Rate I/O", http://www–europe.sgi.com/Technology/xfs–whitepaper.html, Silicon Graphics—XFS White Paper, 1–20, (Mar. 15, 1999) www.europe.sgi.com/Technology/xfs–whitepaper.html.

* cited by examiner

Primary Examiner—Srirama Channavajjala
(74) Attorney, Agent, or Firm—Merchant & Gould P.C.

(57) ABSTRACT

Volume configuration data management systems and methods are described. A logical volume provider maintains an epoch number on each of the extents comprising a volume. Upon each change in the configuration of the volume, the epoch number on each of the currently online extents is updated. When a volume is discovered and a request is made to bring the volume online, the logical volume provider can compare the epoch numbers on the extents to determine if the volume data is consistent across each of the extents, or if an extent contains stale data due to a transitory outage.

9 Claims, 6 Drawing Sheets

LOGICAL VOLUME CONFIGURATION DATA MANAGEMENT DETERMINES WHETHER TO EXPOSE THE LOGICAL VOLUME ON-LINE, OFF-LINE REQUEST BASED ON COMPARISON OF VOLUME EPOCH NUMBERS ON EACH EXTENTS OF THE VOLUME IDENTIFIERS

RELATED APPLICATIONS

This application is related to the following applications, all of which are filed on the same day and assigned to the same assignee as the present application:

"Quorum Resource Arbitrator Within a Storage Cluster"—U.S. patent application Ser. No. 09/449,579, "Storage Management System Having Common Volume Manager"—U.S. patent application Ser. No. 09/449,577, is now pending "Storage Management System Having Abstracted Volume Providers"—U.S. patent application Ser. No. 09/450,364, is now pending "Volume Migration Between Volume Groups"—U.S. patent application Ser. No. 09/451,220, is now pending "Volume Stacking Model"—U.S. patent application Ser. No. 09/451,219, IS now pending.

FIELD OF THE INVENTION

This invention relates generally to computer data storage systems, and more particularly to maintaining volume configuration data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright □ 1999 Microsoft Corporation, All Rights Reserved.

BACKGROUND OF THE INVENTION

As computer systems have evolved so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

A storage volume is a software abstraction of the underlying storage devices and is commonly the smallest self-contained unit of storage exposed by an operating system and administered by a file system. Storage volumes abstract the physical topology of the storage devices and may be a fraction of a disk, a whole disk or even multiple disks that are bound into a contiguous range of logical blocks.

Volumes are constructed from one or more extents, with each extent being a contiguous storage address spaces presented by the underlying storage device. An extent is typically characterized by the size of the address space and a starting offset for the address space from a base of the media. Volume mapping is the process of mapping the contiguous address space presented by the volume onto the usually non-contiguous storage address spaces of the underlying extents. Volume mappings are either implemented on a specialized hardware controller, referred to as a hardware volume provider, or in software by a software volume provider.

Volume mappings may be used to increase the fault tolerance, performance, or capacity characteristics of the underlying storage devices. For example, a technique for improving fault tolerance, known as mirroring or plexing a disk, uses multiple disks. When data is written to one disk the data is also written to a second disk; thus the second disk is a "mirror image" of the first disk. If one disk should fail the other disk is still available for use and has an exact copy of the information on the first disk.

In addition RAID numbers are often used to identify storage volume mappings. A RAID, or Redundant Array of Independent Disks, provides the ability to lose an extent without losing volume data. Access to the volume may be slower or more costly, but is not interrupted by the failure of the underlying extent. RAID1 implements mirroring. RAID3 and above all implement some sort of stripe with parity scheme; the different number indicates the arrangement of the data and check-data (or parity) extents. Striping is a mechanism where data for a file or file system is distributed among several different disks.

Volume providers commonly group logical volumes into what are known as "diskpacks" in order to simplify volume management. The diskpack then is a collection of logical volumes and the underlying disks. Diskpacks provide transitive closure for the volumes contained in the disk pack and may provide group sanity checking to ensure volume configuration correctness.

Two important and related aspects of logical volume management include maintaining establishing the sanity of a volume before it is be exposed to a computer system requesting access to a volume and maintaining volume configuration data.

An exemplary situation in which volume providers need a mechanism to determine the sanity of volume configuration is the occurrence of a hardware failure. For example, when only one of two disks comprising a concatenated volume is operational, the volume provider must indicate to the file system or other data manager that the volume is not capable of handling I/O requests to the areas of the volume that reside on the missing or non-operational disk.

A second example occurs when only one member disk of a mirror set is discovered at system initialization. In this case the volume provider should have a mechanism for determining if the discovered member is stale, i.e. contains data which is out-of-date with respect to that contained on the undiscovered member.

In order to determine sanity of volumes and diskpack, current systems providing logical volume management typically replicate configuration data to either all or to a majority of the disks comprising a diskpack. The configuration data includes such information as the identity of all of the disks comprising the diskpack and a log of volume state changes. The volume provider typically uses the configuration data first to determine that a diskpack is sane prior to attempting to determine the sanity of any volume contained within the group. A common diskpack sanity algorithm is to require that at least a majority of the disks comprising the diskpack are present.

One problem with replicating volume information on each disk of a diskpack is that replication doesn't scale well. As more disks are added to the diskpack, there is more overhead involved in maintaining and replicating the configuration information, and in insuring that the configuration data between disks in the diskpack is consistent.

A second problem is that the volume and disk configuration is statically enforced through the replication of data throughout the volumes and disks in a diskpack. The configuration is statically enforced, because the explicit configuration information is read from the volumes, and is not determined dynamically.

Therefore, there is a need in the art for a system of maintaining volume configuration data that scales well as the number of disks and volumes in a diskpack grows; In addition, there is a need for such a system that allows for the dynamic discovery of the addition of new volumes and new disks to diskpacks as the disks are brought on-line.

SUMMARY OF THE INVENTION

The above-mentioned shortcomings, disadvantages and problems are addressed by the present invention, which will be understood by reading and studying the following specification.

In one such system for maintaining volume, consistency, a data structure containing an epoch number is placed on each of the extents that comprise a volume. Each time a volume configuration change is made, the epoch number is incremented in all of the currently online extents. When a disk volume is discovered by a logical volume manager, the logical volume manager compares the epoch number on the extents. If the epoch numbers are consistent, the volume is exposed as online and made available to applications. If the epoch numbers are not consistent, then at least one extent contains stale data. One aspect of the system is that the volume may still be exposed even if an extent is stale, if the volume can be reconstructed without any data corruption.

A further aspect of the system is that the epoch number can be reported to a cluster services component. This allows for a wider variety of consistency checking and volume exposure policies. The cluster services component can verify that the epoch number on the extents is truly the latest epoch number, thus providing for increased system reliability.

The volume configuration data management system and methods summarized above, and various other aspects of the system will be described in detail in the next section.

The present invention describes systems,.clients, servers, methods, and computer-readable media of varying scope: In addition to. the aspects and advantages of the present invention described in this summary, further aspects and advantages of the invention will become apparent by reference to the drawings and by reading the detailed description. that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
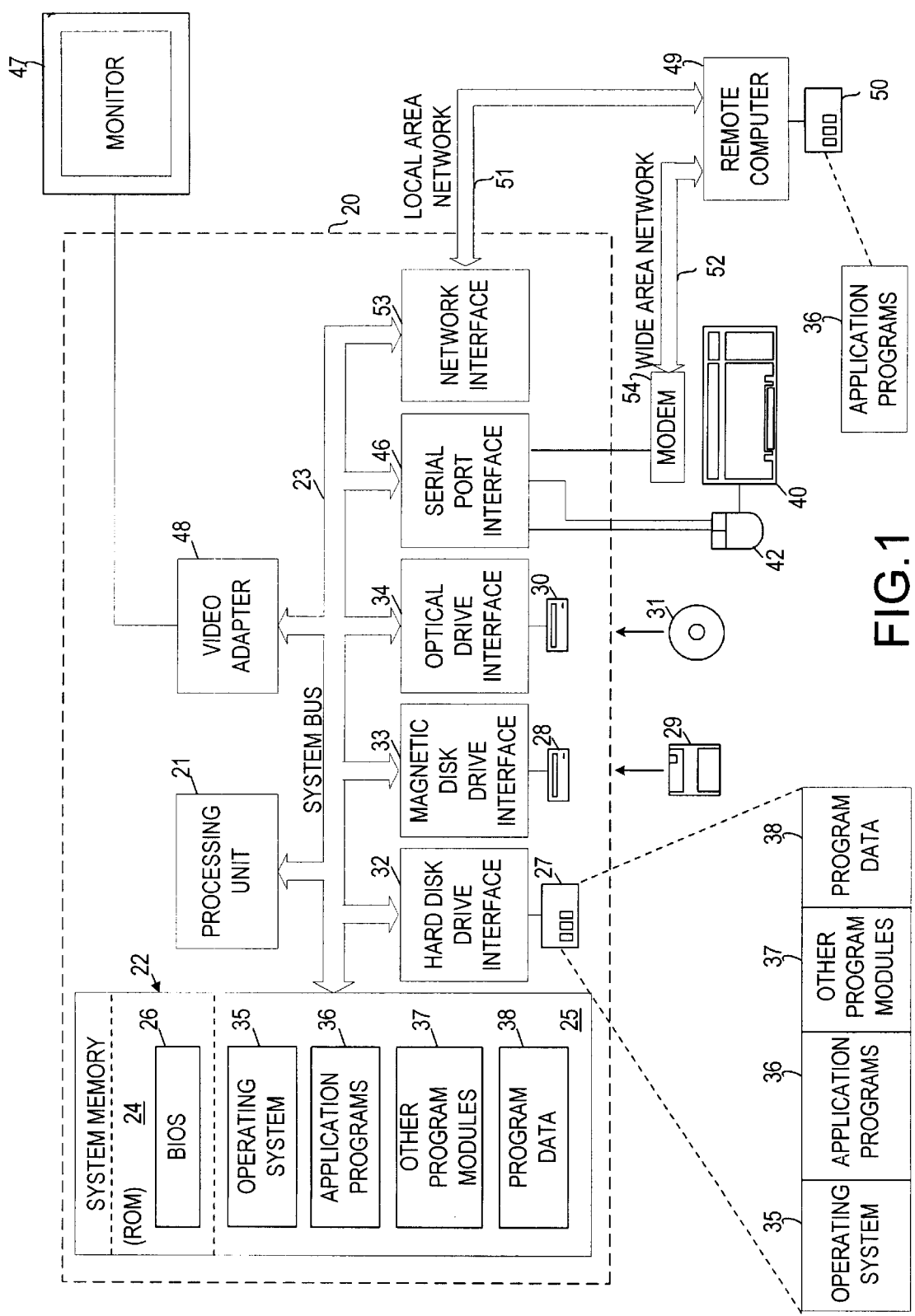
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Definitions

This section presents definitions of terms used in the detailed description. Some of the terms are in common usage in the art, while others are specific to the invention.

Compromised—a status indicating that a fault tolerant volume is missing one or more disk or volume extents; for example, a mirror set with only one mirror currently available.

Configuration data—describes the mapping of physical resources to logical volumes.

Directed configuration—procedure whereby a provider is explicitly provided with rules for choosing logical block remapping.

Export—Move a disk platter and all volumes contained on that platter out of one diskpack.

Exposed—a volume is exposed to an operating system when the volume has an associated volume name (drive letter or volume mount point). The volume can then be made available to a file system or other data store.

Free agent drive—a disk drive which is not a member of a disk pack. Free agent drives cannot contain logical volumes that are exposed.

Health—volume fault management status. The status of a volume may be initializing, healthy, compromised, unhealthy, or rebuilding.

Healthy—containing or able to contain valid data.

Hot-spotting—temporary plexing of a volume or collection of volume extents.

Import—Move a disk platter and all volumes contained on that platter into one diskpack.

Initializing—a status indicating that a volume is rediscovering its volume configuration.

LBN—logical block number.

Logical block mapping—relationship between the logical blocks exposed to the logical volume provider to those exposed by the same provider.

Logical volume provider—software which exposes logical volumes. A provider includes runtime services, configuration data, and management services.

Management service—software that performs volume configuration, monitoring or fault handling.

Mapped volume—a simple linearly logical block mapping which concatenates volumes to expose a single larger volume.

Mirrored volume—a logical volume which maintains two or more identical data copies. Also termed RAID 1.

Parity striped—volume a logical volume which maintains parity check information as well as data. The exact mapping and protection scheme is vendor-specific. Includes RAID 3, 4, 5, 6.

Plexed volume—a dynamic mirror volume. Plexing is used to create a copy of a volume rather than to provide fault tolerance. When plexing, the mirror copy is added to the volume with the intent of removal after the contents have been synchronized.

RAID—Redundant Array of Independent Disks.

Rebuilding—a status indicating that a previously compromised fault tolerant volume is resynchronizing all volume extent data.

Runtime service—software that executes on a per-IO request basis.

SCSI—Small-Computer Systems Interface.

Stacked volume—a volume that has been constructed by more than one logical block mapping operation. An example is a stripe set of mirror volumes. Stacking includes stripping, mapping, and plexing.

Striped volume—a logical block mapping which distributes contiguous logical volume extents across multiple volumes. Also termed RAID 0.

Unhealthy—a status indicating that a non-fault tolerant volume missing one or more disk or volume extents; data contained on unhealthy volumes must not be accessed.

Volume configuration stability—a status to denote whether a volume logical to physical mapping is undergoing change. A volume may be stable, extending, shrinking, plexing, or remapping.

Volume extent—a contiguous range of logical blocks contained on a volume. Volume extents are the smallest managed logical volume unit.

Volume status—a status to denote the current use of a volume by the system. A volume may be unused, hot spare, mapped, used, or unknown.

System Level Overview

A system level overview of the operation of an exemplary embodiment of the invention is described by reference to FIG. 2 and FIG. 3. The concepts of the invention are described as operating in a multiprocessing, multithreaded virtual memory operating environment on a computer, such as computer 20 in FIG. 1.

Figure 2:
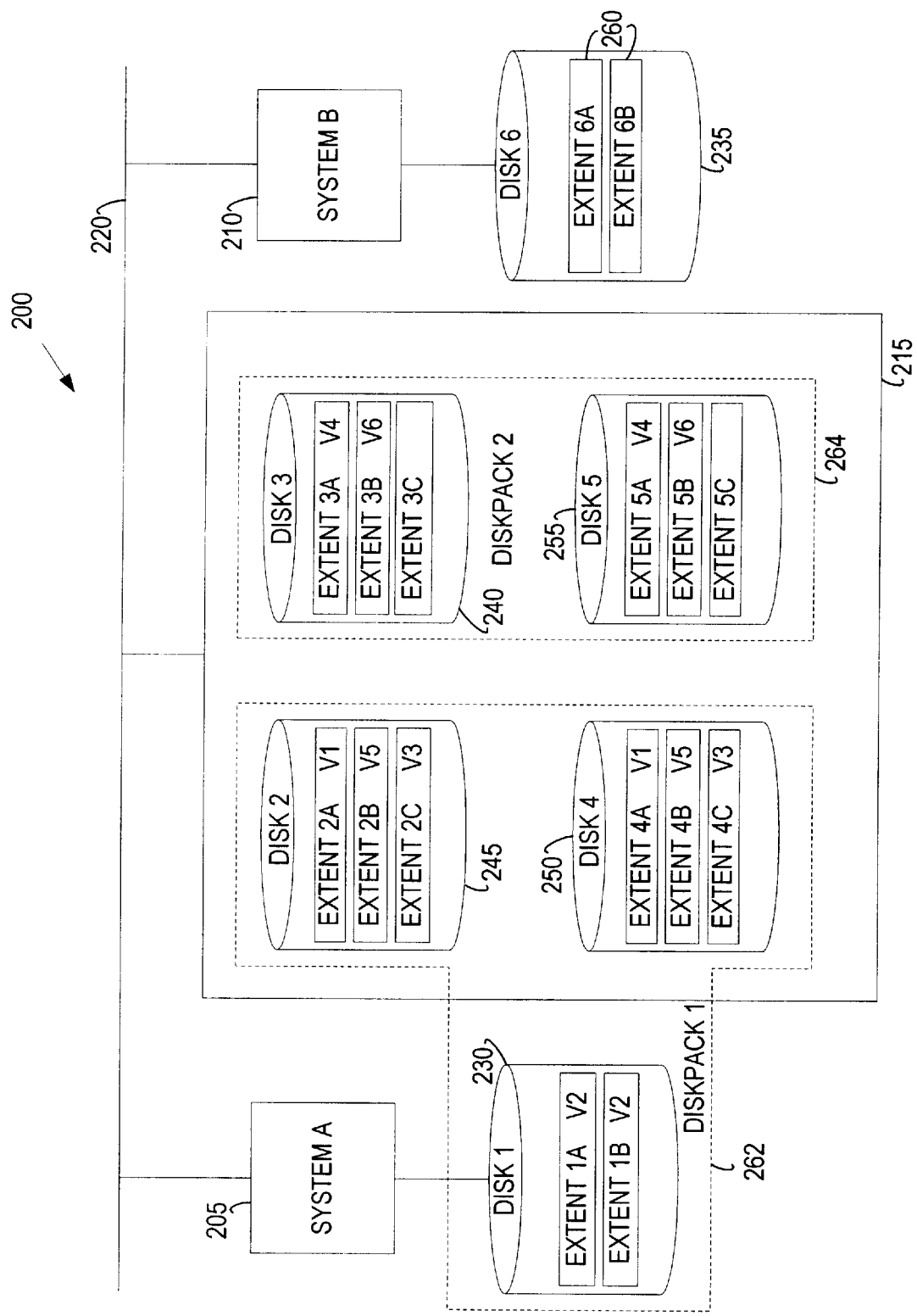
FIG. 2 is a diagram illustrating an exemplary disk storage configuration according embodiments of the invention.

FIG. 2 is a diagram illustrating a hardware configuration used in exemplary embodiments of a volume migration system. Hardware configuration 200 includes computer systems 205 and 210, and disk cabinet 215, all communicatively coupled together via network 220. Computer systems 205 and 210 are computers with a variety of the components described above in references to computer 20 and network 51 of FIG. 1. In an exemplary hardware configuration of an embodiment of: the invention, computer systems 205 and 210 each have a disk operatively coupled to the system, disks 230 and 235 respectively.

Disk cabinet 215 is a peripheral containing a plurality of disks 240, 245, 250 and 255. A disk cabinet such as cabinet 215 is typically used to provide a large amount of storage to one or more computer systems.

Each of disks 230, 235, 240, 245, 250 and 255 have one or more extents 260. An extent is a contiguous storage address space instantiated by physical media such as a disk. An extent is characterized by its starting offset (in sectors) from the base of the disk media and its size. A disk can have a single extent that comprises the entire disk or some subset of the sectors on the disk. Alternatively, a disk can have a plurality of extents of varying sizes, with each extent covering a separate. portion of the disk.

Extents are the basic building blocks used to construct volumes through a process called mapping. The allowable mappings are many-to-many: within one disk there may be extents that are parts of several volumes, and one volume can contain extents residing on several disks.

In general, there are five types of mappings of extents to volumes. The mapping types are as follows:

Simple The volume consists of a single physical extent. In this case the volume may occupy an entire disk or only a portion thereof.

Concatenation The volume consists of at least two extents. The extents are joined in order. Concatenating two disks will yield a volume with size equal to the sum of the size of each extent; the first part of the volume address space resides on the first extent, the later part on the second.

Stripe without parity The volume consists of at least two extents. Component pairs of extents must be of the same size. The extents are interleaved with size "I" (the "stripe width"). Striping two disks will again yield a volume with size equal to the sum of the size of each extent. Volume addresses 0:I reside on the first disk addresses 0:I; volume addresses I+1:2I reside on the second disk addresses 0:I; volume addresses 2I+1:3I reside on the first disk addresses I+1:2I; and so on. The purpose of striping is-to achieve higher read/write data rates by scheduling concurrent I/O requests.

Mirroring The volume consists of at least two extents. The extents fully replicate all data. Mirroring two, three, or more disks of equal size will yield a volume with size equal to that of a single extent. Loss of one disk does not cause any loss of data since there is at least one disk remaining. Any contributing disk may satisfy a read to a mirrored volume since the data is identical on each. A write to a mirrored volume causes writes to each contributing disk to ensure that the data remains identical. Mirroring is also sometimes referred to as "plexing."

Stripe with parity Similar to stripe without parity, with the addition of an extent that maintains parity information. The parity information can be used to reconstruct a damaged or missing extent in the case of a disk failure.

In addition, a volume may be constructed out of other component volumes. A volume constructed in this manner is called a stacked volume. An example of a stacked volume is a striped mirror. In the case of a striped mirror, a minimum of four extents is required. Extent pairs are mirrored to create two mirrored volumes. Those two volumes are then striped to create one stacked volume. That volume will have size equal to the stripe extents.

A number of the disks shown in system 200 have been organized into diskpacks. A diskpack is a set of logical volumes and the underlying disks on which the extents belonging to the volume reside. Diskpacks provide transitive closure for the volumes contained in the disk pack and may provide group sanity checking to ensure volume configuration correctness. A first diskpack 262 includes disks 230, 245 and 250. A second diskpack 264 includes disks 240 and 255.

The configuration described above with reference to FIG. 2 has been presented to illustrate an exemplary configuration in which the invention can operate. No embodiment of the invention is limited to the particular configuration described above, or to any particular number of disks, diskpacks, diskpack configurations, volumes, volume types or volume configurations.

Figure 3:
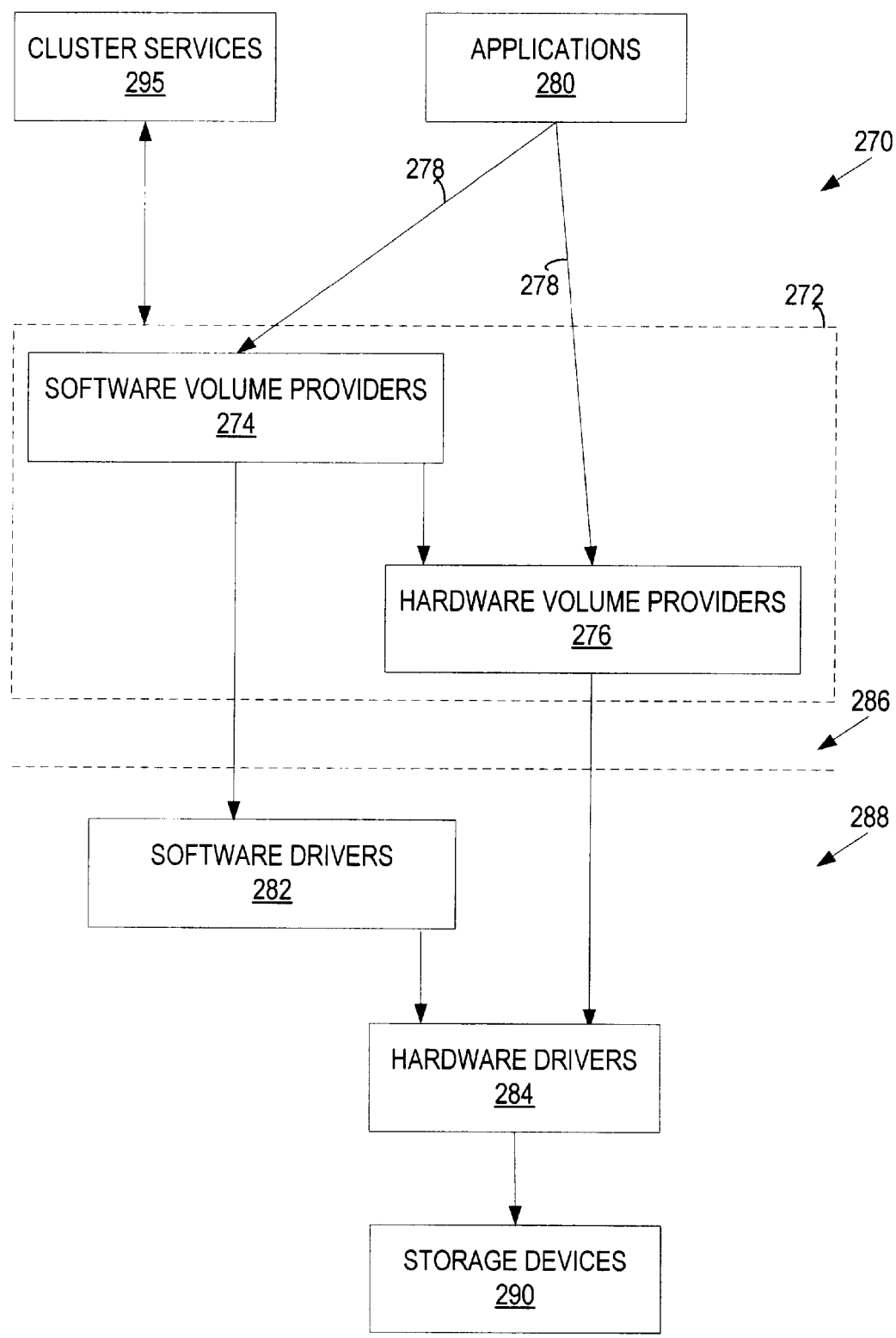
FIG. 3 is a diagram illustrating a system-level overview of exemplary embodiments of a volume configuration data administration system.

FIG. 3 is a block diagram illustrating a storage management software environment in which various embodiments of the invention operate. Storage management system 270 manages various volume providers 272 of storage cluster 200 (FIG. 2) and includes applications 280, software volume providers 274 and hardware volume providers 276 that execute in user space 286. Drivers 282 and 284 support run-time services that are provided by the operating system and execute in kernel space 288. Volume providers 272 perform all management tasks such as volume configuration, performance monitoring and dynamic event handling.

Each volume provider 272 within storage management system 270 has a corresponding hardware driver 284. In addition, a software volume provider 274 can either directly interface to a hardware volume provider 276 or can have a interface to a software driver 282. Drivers 282 and 284 handle all communications with storage devices 290 and can implement one of a variety of protocols such as SCSI ("Small-Computer Systems Interface"), IP ("Internet Protocol"), etc. Drivers 282 and 284 support the run-time services that are provided by the operating system.

According to the invention, volume providers 272 provide applications 280, such as administrative tools and volume management tools, with a high-level, attribute-based view of storage devices 290. More specifically, applications 280 communicate storage access information to volume providers 272 via Application Programming Interface ("API") 278. The storage access information allows applications 280 to deal with storage devices 290 in a uniform or generic manner regardless of the vendor specific interfaces provided by the storage devices 290. For example, in one embodiment the storage access information includes volume configuration information such as storage device mappings.

Based on the storage access information, volume providers 272 perform all disk extent mapping, disk space allocation and mapping type selection. More specifically, volume providers 272 implement sophisticated configuration rules for configuring storage devices 290 based on the storage access information received from applications 280. Thus, API 278 allows applications 280 to manage volume providers 272 without requiring that applications 280. have detailed knowledge of their underlying policies or the physical characteristics of storage devices 290. In this manner, API 278 shields applications 280 from these complex, vendor-specific rules such that an administrator need not be an expert in logical volume management.

Although the volume providers 272 must conform to API 278, the invention places no restraints on how volume providers 272 communicate with the software drivers 282 or hardware drivers 284 and may use any preferred protocol. In this fashion, storage management system 270 requires no changes to conventional drivers 282 and 284. Thus, vendors of storage devices 290 are free to develop their own communication protocols.

Figure 4:
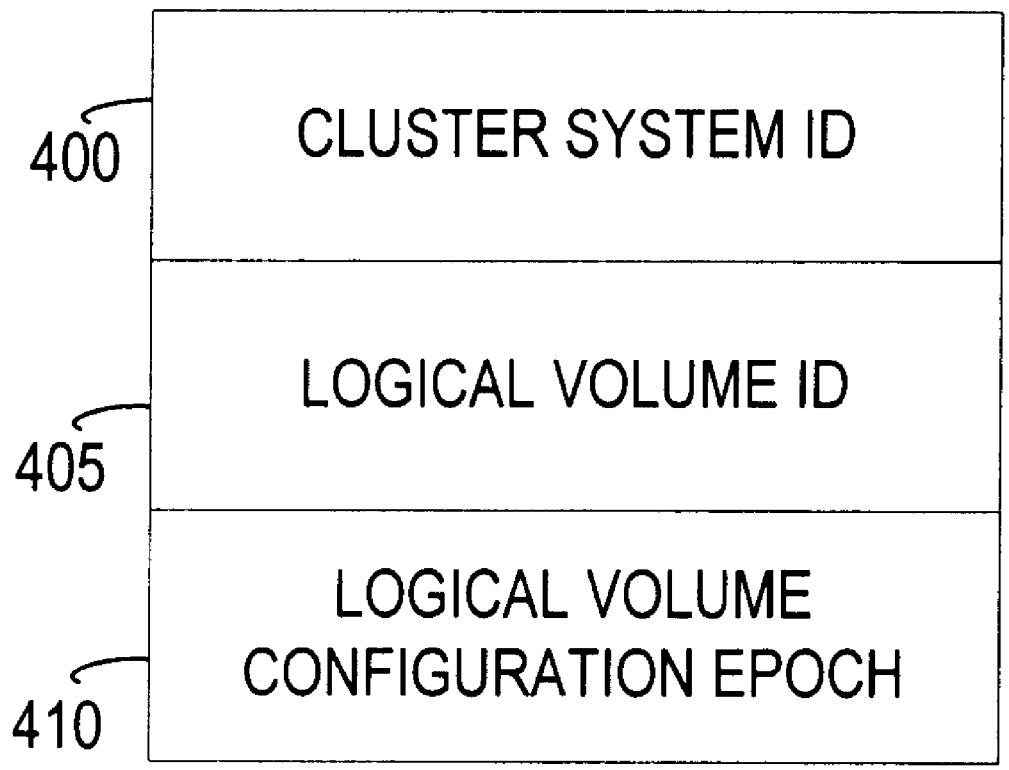
FIG. 4 is a diagram showing a data structure used in an embodiment of the invention that maintains volume configuration data.

A data structure used and maintained by storage management system 270 is shown in FIG. 4. An instance of the data structure is placed on each of the extents that comprise a logical volume. The data structure includes three components, a cluster system ID 400, a logical volume ID 405 and a logical volume configuration epoch 410.

In an embodiment of the invention in which the storage management system interacts with a cluster system, the cluster system ID 400 is a unique identifier of the cluster in which the volume exists. The cluster system ID 400 is assigned and maintained by the cluster software.

The logical volume ID 405 is a unique identifier of the volume described by the data structure. The logical volume ID 405 is assigned and maintained by the logical volume provider 272.

Logical volume configuration epoch 410 is a unique identifier of the last generation of a configuration change to the volume and is maintained by the volume provider. The identifier can be a number that is incremented upon each change in the volume configuration, or it can be a timestamp indicating the time a volume configuration change was made. The invention is not limited to any particular format for the epoch number.

The data structure described above, along with other volume data such as the volume mapping type, volume extent size, number of extents comprising the volume and other volume extent data, is maintained on-disk. It is desirable to maintain the information on-disk, or in other non-volatile media to allow the configuration to persist across operating system and power outages.

In one embodiment of the invention, the above-described components execute the methods described in the next section to maintain volume configuration data and also to determine how a volume should be exposed by the operating system. As the logical volume provider 272 discovers extents (when a disk comes on-line for example), the provider exposes the volume as off-line. The logical volume provider then uses the epoch data maintained on the extents to determine if any of the extents are stale, that is, out of date, with respect to the, other extents of the volume. If no stale extents are found, or if stale extents can be tolerated, the volume is exposed as on-line, which makes the volume available for use by the operating. system and applications desiring to use the volume.

In an alternative embodiment of the invention, a cluster services component 295 is present. An example of such a cluster services component is the cluster services provided by the Windows NT operating system. In this embodiment, the volume provider can report all volume change events to the cluster services component 295. The cluster services component will propagate that change data to the quorum data maintained by those services. The on-disk configuration data described above is the province of the logical volume provider; only the correctness thereof is of concern to cluster quorum data. The known correct quorum configuration data can be accessed any time after the cluster is formed.

In this alternative embodiment, the cluster services component 295 records the cluster quorum data on one or more quorum-devices. It is desirable that the quorum data not reside on a mirrored volume. The volume manager records information about volume state transitions in the quorum data. The robust replication of quorum data is the responsibility of the cluster services component 295. While multiple copies of the quorum data should be maintained for fault tolerance, the number of such copies may be significantly less than the number of disks managed by the volume provider or disks accessed by the node. Thus a higher level of data integrity is maintained than in embodiments of the invention that do not utilize a cluster services component.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to the flowcharts shown in FIGS. 5 and 6. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 5 and 6 are inclusive of the acts required to be taken by an operating environment executing an exemplary embodiment of the invention.

Figure 5:
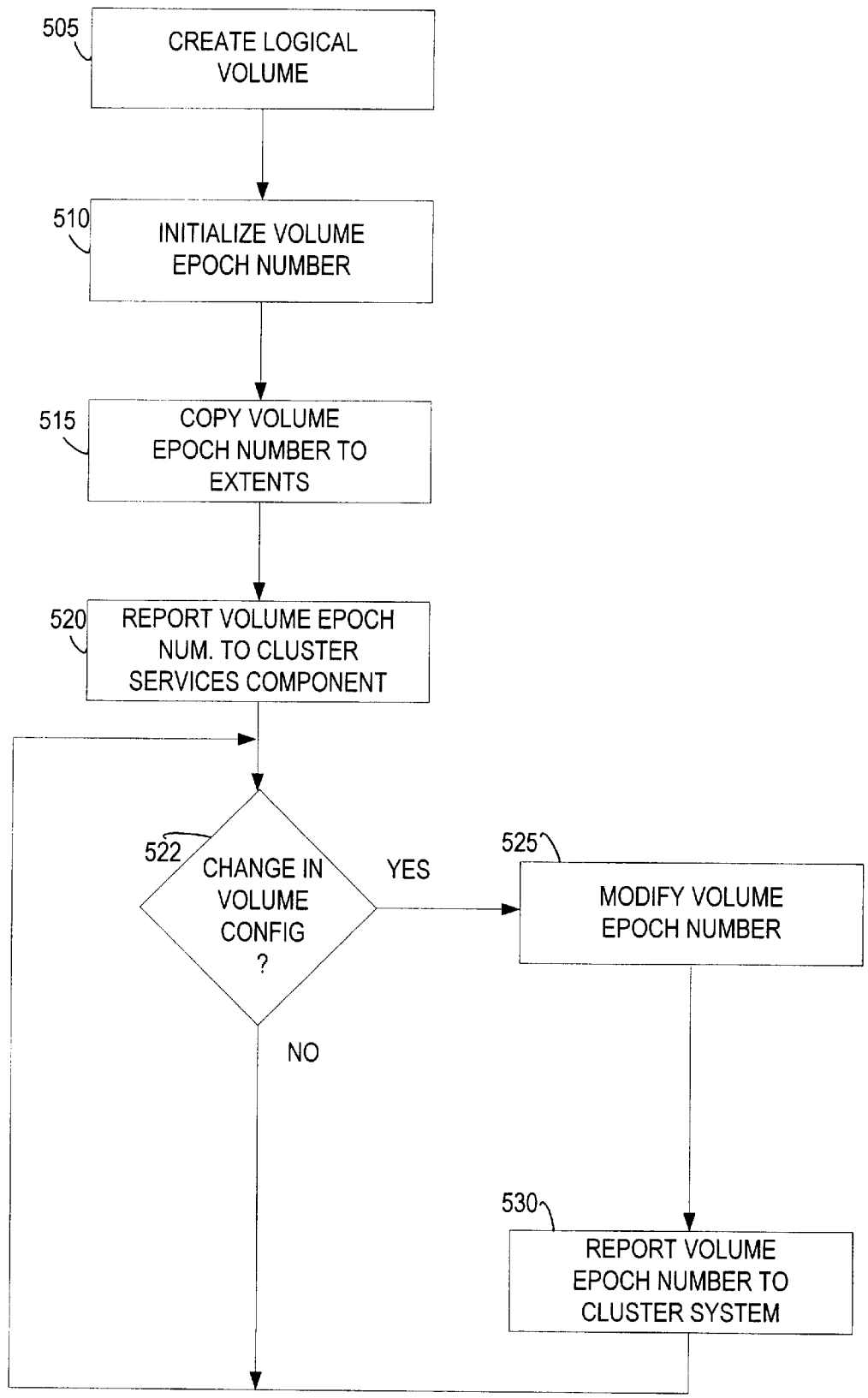
FIG. 5 is a flow diagram illustrating a method of maintaining volume configuration data according to an embodiment of the invention.
Figure 6:
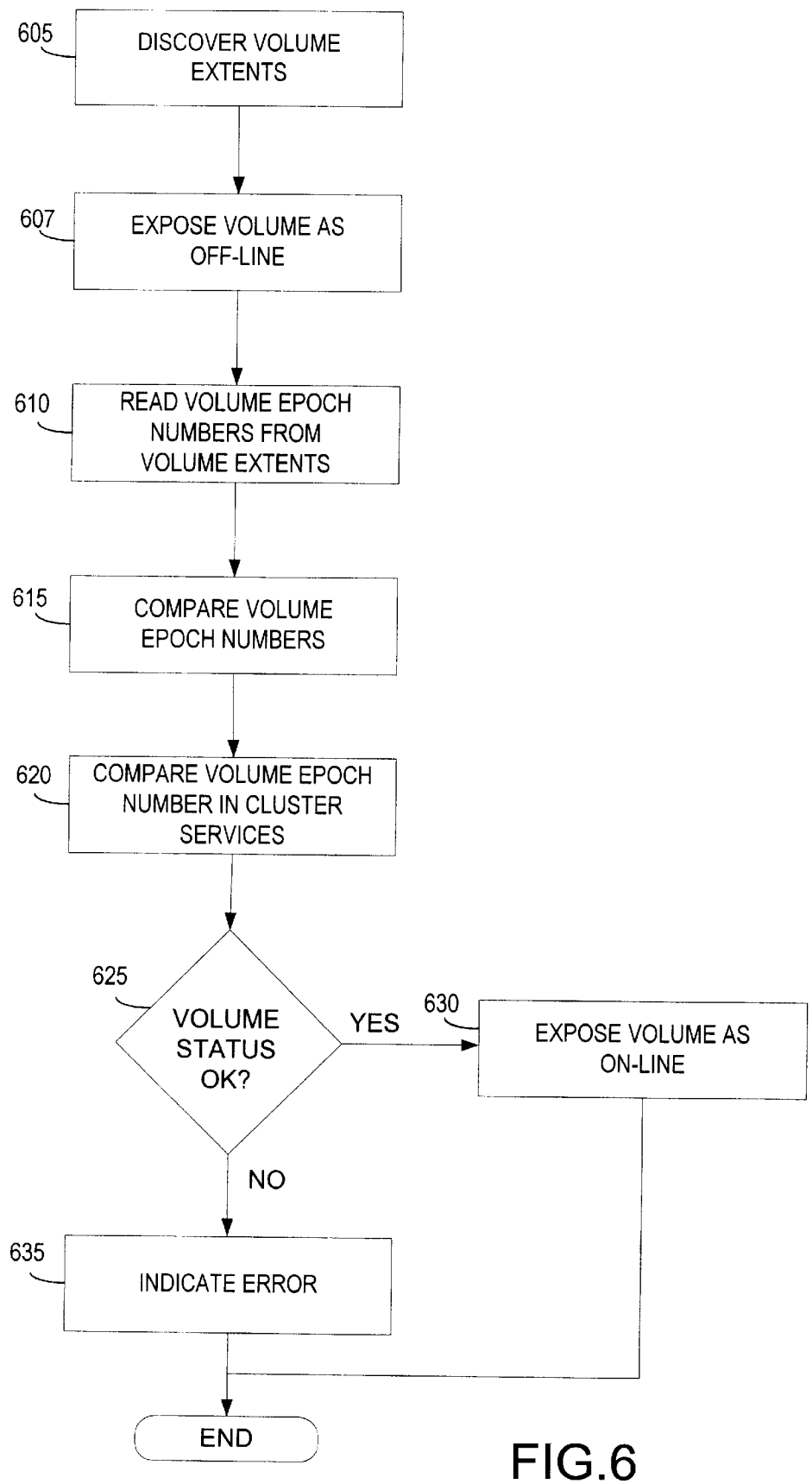
FIG. 6 is a flow diagram illustrating a method of determining volume consistency according to an embodiment of the invention.

A method of maintaining logical volume configuration data according to one embodiment of the invention is shown in FIG. 5. A logical volume manager or other program component executing a method of the invention begins by creating a logical volume (block 505). The type of logical volume can be any of the volume types described above, such as a mirrored volume, a concatenated volume, a striped volume or a striped volume with parity. The invention is not limited to any particular type of volume, as those of skill in the art will appreciate.

Next, a program executing the method initializes an epoch number for the volume (block 510). The invention is not limited to any particular value for the initial epoch number. This epoch number is then copied to a data structure on each extent comprising the logical volume (block 515). In one embodiment of the invention, the data structure is the exemplary a data structure shown in FIG. 4, however the invention is not limited to any particular data structure.

In an embodiment of the invention where a cluster services component exists, a program executing a method of the invention reports the epoch number to the cluster services component (block 520). The epoch number is stored in a data structure that is maintained by the cluster services component which enables a program implementing the methods of the invention to perform enhanced volume configuration sanity detection. In an alternative embodiment of the invention where a cluster services component is not present, no reporting is required.

Next, a program executing the method, such as a logical volume manager, waits for changes in a volume's configuration (block 522). The method is not limited to any particular method of waiting or detecting changes in volume configuration. It is desirable that only changes to the configuration of the volume need be detected. This includes changes such as the addition and deletion of extents to and from a volume, and the resizing of extents for a volume. Other events, such as input and output to the volume need not be detected by the method.

If a volume configuration change is detected and completed, the epoch number associated with the volume is modified (block 525). In one embodiment of the invention, the epoch number is incremented. In an alternative embodiment of the invention, the epoch number is modified by setting the epoch number to a current time stamp. The invention is not limited to any particular means of modifying the epoch number, the only requirement being that the epoch number increase monotonically upon each configuration change. The epoch number on the volume configuration data structure present on each extent of the reconfigured volume is updated to reflect the modification.

In an embodiment of the invention in which a cluster services component is present, the new epoch number is also reported to the cluster services component to allow it to update its copy of the epoch number associated with the volume (block 530).

The method then returns to block 522 to await the next volume configuration change.

In FIG. 6 a method according to one embodiment of the invention is shown for determining the consistency status of a volume. The method begins when an application executing the method, such as a logical volume manager, discovers an extent or extents belonging to a volume (block 605). The logical volume provider exposes the newly discovered volume as offline (block 607). When a volume is offline, it is unavailable to the file system or other data manager. It is desirable that while the volume is offline, the provider does not change the volume configuration data on the drive nor initiate any volume rebuild (e.g. mirror synchronization) activity.

Next, the logical volume manager reads the volume epoch numbers from each of the extents that comprise the volume identified in the request (block 610). The logical volume manager compares the epoch number read from the extents (block 615) to determine if they are equal. If they are not equal, one or more of the extents contain stale data. In an embodiment of the invention in which a cluster service component is present, the cluster service component will compare the volume epoch number it maintains with the epoch. number or numbers from the volume extents (block 620).

Next, the method uses the results of the comparisons to determine if the volume can be exposed (block 625). The determination of whether a volume should be exposed can vary depending on the type of volume and the policies that a user of the system desires to implement. For example, if strict consistency checking is desired, the volume status will indicate that the volume should be exposed only if each and every volume epoch number matches.

Alternatively, a looser consistency may be acceptable to some users. For example, in the case of a mirror volume in which a disk failure has caused one of the mirrored extents to be unavailable, the policy can be to expose the volume as online if the available extent has an epoch number that matches the epoch number maintained by the cluster service component. Otherwise, if the epoch number does not match, a stale volume has been discovered and the volume remains offline.

If the logical volume manager, and in one embodiment of the invention, the cluster services component, determines that the volume configuration is consistent, the volume is exposed as, online (block 630). The volume manager will permit the online request if and only if I/O requests can proceed without data corruption. For spanned and striped volumes, all volume or disk extents must be present. For mirrors and parity stripe volumes, the volume may be compromised, that is, one or more extents may be missing. The volume will be exposed as online as long as sufficient extents with current configuration data remain to allow the data on the volume to be reconstructed safely.

Otherwise, the volume remains offline and an error is indicated to the requestor (block 635).

The particular methods for maintaining volume configuration data and volume consistency have been described. The methods have been shown by references to a series of flowcharts including all the actions from block 505 until 530 and from blocks 605 to 635. The methods provide an efficient scalable mechanism for maintaining volume configuration data and volume consistency.

The system and methods described provide advantages not found in previous systems. The systems and methods provide for volume configuration data consistency that scales well as disk storage systems become larger and include more disks, volumes and extents. In addition, the consistency criterion for the volumes is easier to achieve and maintain. This is because the diskpack, volumes and extents are discovered dynamically rather than being enforced by data replication and because volume configuration data need not be replicated to all, or to even a majority of the disks within the diskpack.

A further advantage is that the behavior of the system is much more dynamic than previous systems. Volume extents may appear and disappear at any time; volumes will be exposed or I/O requests blocked as appropriate. The systems and methods of the invention provide this behavior while guaranteeing that data are not corrupted due to missing volume components.

CONCLUSION

The management of volume configurations and volume configuration data has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the management of volume configuration data has been described, other disk entities, such as disk partitions or database segments can also be managed using the systems and methods of the invention. The terminology used in this application. with respect to volume configuration data management is meant to include all of these environments. Therefore, it is manifestly intended that this invention be limited only by the following claims and equivalents thereof.

We claim:

1. A computerized system operable to control access to a logic volume by a requester, the logical volume having at least two discs associated therewith, each disc including at least one extent, comprising:

a computer comprising a processor, a memory, and a computer-readable medium operatively coupled together;

an operating environment executing in the processor from the computer-readable medium;

a logical volume manager operative to control a configuration of logical volume;

wherein the logical volume manager maintains on each of the extents of the at least two discs a volume data structure having a volume epoch number and wherein the logical volume manager modifies the volume epoch numbers of each on-line extent upon a change in a configuration of the volume; and wherein the logical volume manager exposes the logical volume as off-line to the requester in response to the detection of at least one of an addition of an extent to the logical volume, a deletion of an extent from the logical volume, or a change in the size of an extent of the logical volume; and wherein the logical volume manager determines whether to expose the logical volume as on-line to the requester based on a comparison of volume epoch numbers maintained by the logical volume manager.

2. The computerized system of claim 1, wherein the volume epoch numbers are modified by incrementing each online volume epoch number.

3. The computerized system of claim 1, wherein the volume data structure on each extent further includes a volume identifier.

4. The computerized system of claim 1, wherein the logical volume manager determines a status of a volume by comparing the volume epoch numbers on each of the extents of the volume.

5. The computerized system of claim 1, further comprising a cluster system component operative to maintain a data structure having a volume epoch number that is modified upon a change to the volume configuration.

6. The computerized system of claim 5, wherein the logical volume manager determines a status of a volume configuration by comparing the epoch number on the data structure maintained on the extent with the epoch number on the data structure maintained by the cluster system component.

7. A computer-readable medium having computer-executable instructions for performing a method for managing access to a logical volume by a requester, the logical volume having at least two data storage devices associated therewith, each data storage device including at least one extent associated with the logical volume, the method comprising:

setting a volume epoch identifier to an initial value;

copying the volume epoch identifier to a data structure on each extent associated with the logical volume;

modifying the volume epoch identifier on the data structure on each on-line extent associated with the logical volume upon a change to a configuration of the logical volume;

detecting one of the discs coming on-line;

in response to detecting the one of the discs coming on-line, comparing the epoch identifiers on the data structures of each on-line extent associated with the logical volume; and determining if the volume is to be exposed to the requester as on line based on the comparison of the epoch identifiers.

8. The computer-readable medium of claim 7, wherein modifying the volume epoch identifier comprises incrementing a current value of the volume epoch identifier.

9. The computer-readable medium of claim 7, further comprising:

copying the volume epoch identifier to a data structure maintained by a cluster services component after the volume epoch identifier has been initialized; and modifying the volume epoch identifier on the data structure maintained by the cluster services component upon a change to a configuration of the logical volume.

* * * * *

UNITED STATES PATENT AND TRADEMARK OFFICE
CERTIFICATE OF CORRECTION

PATENT NO. : 6,553,387 B1
DATED : April 22, 2003
INVENTOR(S) : Cabrera et al.

It is certified that error appears in the above-identified patent and that said Letters Patent is hereby corrected as shown below:

Column 1,
Line 43, delete """ and insert -- © --.

Column 2,
Line 36, delete "be".

Column 3,
Line 12, delete ";" and insert -- . --
Lines 45 and 47, delete "."
Line 46, delete ":" and insert -- . --

Column 5,
Line 1, delete "." after the words -- the -- and -- several --
Line 34, delete "."

Column 7,
Line 21, replace "stripping" with -- striping --

Column 8,
Line 4, delete "." after the word -- separate --

Column 10,
Line 29, delete "," after the word -- the --
Line 32, delete "."

Column 13,
Line 30, delete "."

Signed and Sealed this

Second Day of December, 2003

JAMES E. ROGAN
*Director of the United States Patent and Trademark Office*